United States Patent
Bourgois et al.

(10) Patent No.: US 6,883,551 B2
(45) Date of Patent: Apr. 26, 2005

(54) BRAIDED HOSE REINFORCEMENT AND METHOD OF MANUFACTURE

(75) Inventors: Luc Bourgois, Desselgem (BE); Paul Dambre, Kemmel (BE); Dirk Meersschaut, Ooigem (BE); Luc Ravelingien, Aalter (BE)

(73) Assignee: N.V. Bekaert S.A., Zwevegem (BE)

( * ) Notice: Subject to any disclaimer, the term of this patent is extended or adjusted under 35 U.S.C. 154(b) by 33 days.

(21) Appl. No.: 10/296,064

(22) PCT Filed: Apr. 5, 2001

(86) PCT No.: PCT/EP01/05019

§ 371 (c)(1),
(2), (4) Date: Nov. 21, 2002

(87) PCT Pub. No.: WO01/92770

PCT Pub. Date: Dec. 6, 2001

(65) Prior Publication Data

US 2004/0099323 A1 May 27, 2004

(30) Foreign Application Priority Data

May 31, 2000 (EP) .......................................... 002019420

(51) Int. Cl.⁷ ................................................ F16L 11/00
(52) U.S. Cl. ........................ 138/127; 138/130; 138/134; 138/153; 138/DIG. 5; 428/36.91
(58) Field of Search ............................... 138/130, 127, 138/134, 153, DIG. 5; 428/36.91

(56) References Cited

U.S. PATENT DOCUMENTS

| 3,944,453 | A | * | 3/1976 | Chudgar et al. ............. 156/143 |
| 4,259,991 | A | * | 4/1981 | Kutnyak ...................... 138/127 |
| 4,275,937 | A | | 6/1981 | Belofsky |
| 4,427,033 | A | * | 1/1984 | Ege ............................ 138/103 |
| 4,567,917 | A | * | 2/1986 | Millard ....................... 138/126 |
| 4,688,605 | A | * | 8/1987 | Eisenzimmer et al. ...... 138/130 |
| 4,802,510 | A | * | 2/1989 | Berlincourt et al. ......... 138/125 |
| 4,836,080 | A | * | 6/1989 | Kite et al. ........................ 87/9 |
| 4,952,262 | A | * | 8/1990 | Washkewicz et al. ........ 156/149 |
| 5,338,380 | A | | 8/1994 | Yutori et al. |
| 5,655,572 | A | * | 8/1997 | Marena ....................... 138/125 |
| 5,927,345 | A | * | 7/1999 | Samson ....................... 138/127 |
| 5,956,935 | A | | 9/1999 | Katayama et al. |
| 6,039,084 | A | * | 3/2000 | Martucci et al. ............. 138/137 |
| 6,170,533 | B1 | * | 1/2001 | He .............................. 138/127 |
| 6,302,152 | B1 | * | 10/2001 | Mulligan .................... 138/125 |
| 6,408,891 | B1 | * | 6/2002 | Jung et al. .................. 138/127 |

FOREIGN PATENT DOCUMENTS

EP  0 246 019 A  11/1987
FR  1 522 053 A  8/1968

* cited by examiner

Primary Examiner—James Hook
(74) Attorney, Agent, or Firm—Foley & Lardner LLP

(57) ABSTRACT

A braided hose reinforcement (14) comprises left and right turning strips (20, 22). Each of said strips comprises a number of steel wires. The steel wires (24) located at the side regions of the strips have a tensile strength which is substantially lower than the tensile strength of the steel wires of the central region.

11 Claims, 1 Drawing Sheet

BRAIDED HOSE REINFORCEMENT AND METHOD OF MANUFACTURE

FIELD OF THE INVENTION

The invention relates to a braided hose reinforcement.

BACKGROUND OF THE INVENTION

Hoses, for example hydraulic and pneumatic hoses, conventionally comprise a flexible inner tube, such as a rubber or plastic inner tube surrounded by one or more tubular braids of metal wires.

Since these hoses are used for conveying high pressure fluids or gases, they have to withstand the forces of the pressure within the hose.

In order to obtain a high impulse strength, high strength carbon steel wires are utilized as reinforcing elements.

In a still continuing effort to save weight of a hose reinforcement and to increase the flexibility, there is a trend to use wires with a higher tensile strength.

However, because of the high internal pressure, high transversal stresses are applied on the reinforcing elements. This has as consequence that the hose can not be utilized at its full strength.

To minimize the stresses on the wires, the strips can be braided in such a way that the braided structure does not provide 100% coverage of the inner tube but for example only 80 or 85% coverage. The separation between adjacent strips permits some freedom of movement of the wires during flexing and/or application of fluid pressure to the hose and results in good stress transfer from wire to wire.

Other ways to minimize the stresses applied on the wires is to provide a hose reinforcement which comprises several superimposed layers of wires. Such reinforcement structures, however, have the disadvantage of a higher weight.

SUMMARY OF THE INVENTION

It is an object of the present invention to provide a braided hose reinforcement with an increased strength and endurance.

It is also an object of the invention to decrease the weight and to increase the flexibility of a hose reinforcement while maintaining a high strength.

According to a first aspect of the invention, a braided hose reinforcement is provided. The hose reinforcement comprises a number of left and right turning strips. The left turning strips are bent in such a way that they subsequently run above and under the right turning strips; while the right turning strips are bent so that they subsequently run above and under the left turning strips.

Each of the strips comprises a number of steel wires arranged in adjoining parallel relation so that each strip is substantially flat.

A strip has a longitudinal central region and two longitudinal side regions. Each of these central and side regions comprises one or more steel wires.

A strip comprises preferably between four and ten steel wires, more preferably a strip comprises between six and eight wires.

In a preferred embodiment the number of steel wires in the side regions is one; while the number of steel wires of the central region ranges between four and six.

The steel wires preferably have a diameter between 0.10 and 0.90 mm, for example 0.20 mm.

The steel wires of the side regions and the steel wires of the central region may all have the same diameter.

Alternatively, the steel wires of the side regions have a bigger diameter than the steel wires of the central region.

The wires may be round wires or they may be flattened, for example to wires having a rectangular cross-section or a rectangular cross-section with rounded edges.

The steel wires incorporated in the hoses preferably have a carbon content between 0.70% and 1.20% and a tensile strength between 2150 and 4000 N/mm$^2$.

Since each strip passes alternately over and under a transversely directed strip, the wires are deformed.

Consequently, stresses are created on the wires, more particularly on the segments of the wires between adjacent overlying and underlying transverse strips.

The stresses created in each segment will depend on the level of pinching exerted by the wires lying over and under the wire.

This pinching gives rise to a rather complex form of stress, which is not simply tensile or traction, but is also including transversal forces on certain points along the wires.

The wires of the side regions of a strip suffer most from this pinching effect.

It has been shown that transversal forces have a negative impact on the breaking load of a metal wire.

Consequently, due to the pinching effect, creating transversal contact stresses, the high tensile wire can not be used at its full potential.

This means that the full strength of the hose remains limited although high tensile wire is used.

Therefore, according to the present invention, the steel wire or steel wires of the side regions have a tensile strength which is substantially lower than the tensile strength of the steel wire or steel wires of the central region. The steel wire or steel wires of the side regions may withstand the stresses to a higher degree since they have a higher ductility.

Preferably, the steel wire or steel wires of the side regions of a strip have a tensile strength which is at least 10% lower than the tensile strength of the steel wire or steel wires of the central region.

More preferably, the steel wire or steel wires of the side regions have a tensile strength which is at least 20% lower than the tensile strength of the steel wire or steel wires of the central regions The steel wire or steel wires of the central region preferably have a tensile strength higher than 2150 MPa; more preferably the tensile strength is higher than 2800 MPa.

Wires suitable to be used as wires for the side regions are for example stress-relieved wires.

These stress-relieved wires preferably have an elongation at rupture exceeding 4%.

Alternatively, the steel wire or steel wires of the side regions can be wires having a lower carbon content than the steel wire or steel wires of the central region.

The carbon content of the steel wire or steel wires of the side regions is for example lower than 0.80%.

It can be preferred that the steel wire or steel wires of the side regions of a strip are flat wires or wires with a rectangular cross-section.

The steel wires may be coated to assure satisfactory adhesion to the elastomer of the hose.

Suitable coatings are copper or zinc or coatings comprising an alloy of these metals, such as brass.

The braided hose reinforcement may comprise steel wires arranged in one layer or may comprise multiple layers.

In case the hose reinforcement comprises more layers a thin polymer layer may be present between two different layers to provide stress transfer from one layer to the other.

According to a second aspect of the invention a hose, pipe or tube comprising a hose reinforcement as described above is provided.

According to a further aspect of the invention a method of manufacturing a hose reinforcement is provided.

The method comprises the steps of providing a number of strips; each strip having a longitudinal central portion and two longitudinal side regions; each of said central and side regions comprising one or more steel wires; said one or more steel wires of said side regions having a tensile strength which is substantially lower than the tensile strength of said one or more steel wires of said central region;

braiding said strips to form the reinforcement.

It is clear that all embodiments of strips described above can be considered for the manufacturing of the hose reinforcement.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
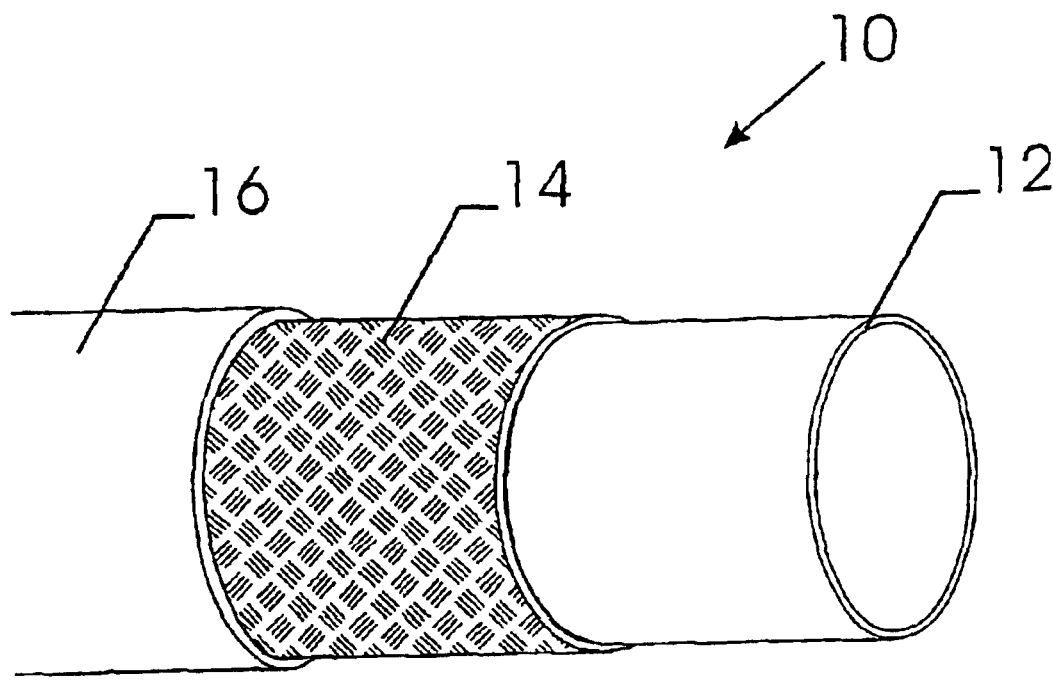
FIG. 1 shows a reinforced hose according to the present invention.

FIG. 1 shows a flexible hose 10.

The hose comprises:

an inner tube 12;

a reinforcement structure 14, comprising at least one tubular braid;

an outer cover 16.

Figure 2:
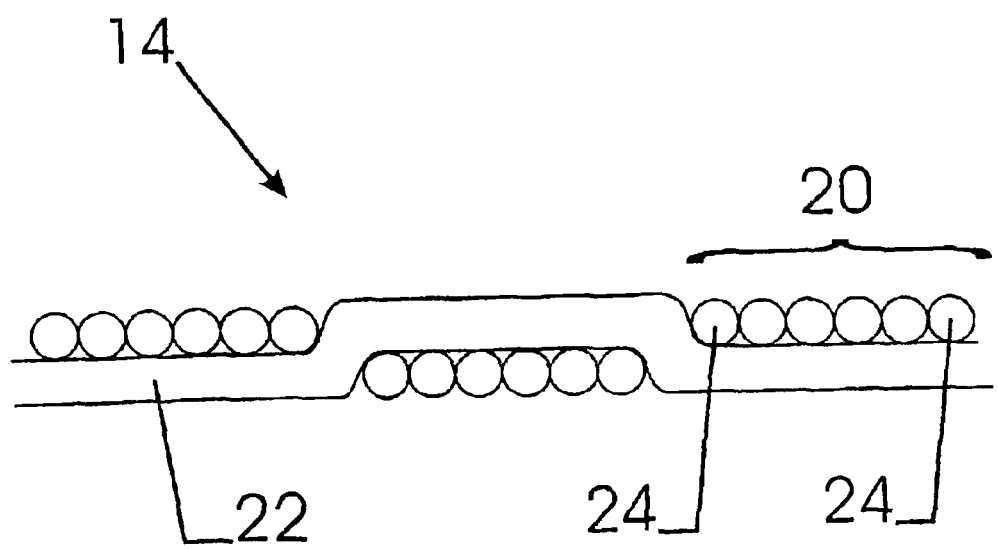
FIG. 2 is the cross-section of the reinforcement shown in FIG. 1.

FIG. 2 shows the cross-section of the reinforcement structure 14. The reinforcement structure comprises strips 20 passing alternately over and under transversely directed strips 22.

A strip comprises 6 steel wires having a diameter between 0.10 and 0.90 mm. All steel wires of the strip have the same diameter The side regions of the strip comprise one wire, whereas the central region of the strip comprises 4 wires.

The steel wires of the central region are for example carbon steel wires with a carbon content between 0.70% an 1.20%. Also high carbon micro-alloyed steel comprising from 0.70% to 1.20% C, 0.10 to 1.2% Mn and up to 0.40% of chromium, cobalt, molybdenum, nickel, and/or vanadium can be used.

The tensile strength of the wires is preferably higher than 2800 N/mm$^2$. The steel wires can be coated with a brass layer.

The steel wires of the side regions 24 are stress-relieved steel wires.

A stress-relieved wire suitable to be used as a wire of the side regions of a strip may be obtained as follows:

A steel wire or a steel wire coated with a layer of brass is drawn until a final diameter between 0.10 and 0.90 mm and a tensile strength $R_m$ of about 2800 to 3600 N/mm$^2$.

The drawn steel wire is then subjected to a stress-relieving treatment, e.g. by passing the wire through a high-frequency or mid-frequency induction coil, heating the wire to a temperature of 300 to 450° C.

In another embodiment, the wires of the side regions are replaced by wires having a tensile strength of 2500 N/mm$^2$.

The deformation and stresses created on the wires of the side regions of a strip 24 are more pronounced than those created on an inner wire due to the pinching effect of the adjacent underlying and overlying transverse strip.

By replacing the wires of the side regions of the strips with wires characterised by a tensile strength which is substantially lower than the tensile strength of the wires of the central region, the strips may withstand the stresses to a higher degree.

What is claimed is:

1. A braided hose reinforcement comprising left and right turning strips, said left turning strips being bent so that they subsequently run above and under said right turning strips and vice versa, each of said strips having a longitudinal central region and two longitudinal side regions, the side regions forming a boundary between the longitudinal central region and an outside of the strips; each of said central and side regions comprising one or more steel wires, wherein said one or more steel wires of said side regions have a tensile strength which is substantially lower than the tensile strength of said one or more steel wires of said central region.

2. A hose reinforcement according to claim 1, wherein said one or more steel wires of said side regions have a tensile strength which is at least 10% lower than the tensile strength of said one or more steel wires of said central region.

3. A hose reinforcement according to claim 1, wherein said one or more steel wires of said side regions are stress-relieved.

4. A hose reinforcement according to claim 3, wherein said stress-relieved wires have an elongation at rupture exceeding 4%.

5. A hose reinforcement according to claim 1, wherein said one or more steel wires of the side regions have a carbon content lower than 0.80%.

6. A hose reinforcement according to claim 1, wherein said one or more steel wires of said side regions are flat wires or wires with a rectangular cross-section.

7. A hose reinforcement according to claim 1, wherein the number of the steel wires in said side regions equals one.

8. A hose reinforcement according to claim 1, wherein the steel wire in the central region has a tensile strength higher than 2800 MPa.

9. A hose, pipe or tube comprising a hose reinforcement according to claim 1.

10. A method of manufacturing a hose reinforcement according to claim 1, said method comprises the steps of:

providing a number of strips; each strip having a longitudinal central portion and two longitudinal side regions; each of said central and side regions comprising one or more steel wires; said one or more steel wires of said side regions having a tensile strength which is substantially lower than the tensile strength of said one or more steel wires of said central region; and braiding said strips to form the reinforcement.

11. A braided hose reinforcement comprising left and right turning strips, said left turning strips being bent so that they subseciuently run above and under said right turning strips and vice versa, each of said strips having a longitudinal central region and two longitudinal side regions; each of said central and side regions comprising one or more steel wires, wherein said one or more steel wires of said side regions have a tensile strength which is substantially lower than the tensile strength of said one or more steel wires of said central region, wherein said one or more steel wires of said side regions and said one or more steel wires of said central region all have the same diameter.

* * * * *